US010614470B2

(12) United States Patent
Wooden et al.

(10) Patent No.: US 10,614,470 B2
(45) Date of Patent: Apr. 7, 2020

(54) DIVIDED TRANSMISSION OF GPS COORDINATES

(71) Applicant: iHeartMedia Management Services, Inc., San Antonio, TX (US)

(72) Inventors: Richard D. Wooden, Ogallala, NE (US); Theodore N. Myers, Fort Collins, CO (US); Jeffrey D. Zigler, Omaha, NE (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 0 days.

(21) Appl. No.: 16/199,830

(22) Filed: Nov. 26, 2018

(65) Prior Publication Data

US 2019/0095930 A1 Mar. 28, 2019

Related U.S. Application Data

(63) Continuation of application No. 12/569,375, filed on Sep. 29, 2009, now abandoned.
(Continued)

(51) Int. Cl.
*G06Q 30/00* (2012.01)
*G06Q 30/02* (2012.01)
(Continued)

(52) U.S. Cl.
CPC ........... *G06Q 30/02* (2013.01); *A63F 13/216* (2014.09); *B60R 25/33* (2013.01); *G06Q 30/0207* (2013.01); *G06Q 30/0241* (2013.01)

(58) Field of Classification Search
CPC ...... G06Q 30/0207–0277; B60R 25/33; A63F 13/216
(Continued)

(56) References Cited

U.S. PATENT DOCUMENTS 7,996,256 B1 8/2011 Anand et al.
2003/0141990 A1* 7/2003 Coon ................... G08G 1/0965
340/902

(Continued)

FOREIGN PATENT DOCUMENTS

KR 20000072578 A * 12/2000

OTHER PUBLICATIONS

"Steering clear of traffic tie-ups just got easier", 2005, found at https://www8.garmin.com/specs/gtm1 0_0905.pdf.
(Continued)

*Primary Examiner* — Michael Bekerman
(74) *Attorney, Agent, or Firm* — Garlick & Markison; Edward J. Marshall

(57) ABSTRACT

Information associated with a geographic location is encoded, in a format readable by a mobile device including a GPS receiver, into a sideband channel of a first transmission medium. The information includes first partial global positioning system (GPS) coordinates, which are insufficient by themselves to completely identify the geographic location. The first partial GPS coordinates are transmitted via the sideband channel of the first transmission medium. Second partial GPS coordinates are transmitted to the mobile device via a second transmission medium. The first and second partial GPS coordinates are sufficient, when combined, to fully identify the geographic location.

20 Claims, 10 Drawing Sheets

Related U.S. Application Data

(60) Provisional application No. 61/101,452, filed on Sep. 30, 2008.

(51) Int. Cl.
*B60R 25/33* (2013.01)
*A63F 13/216* (2014.01)

(58) Field of Classification Search
USPC .............................................. 705/14.1–14.73
See application file for complete search history.

(56) References Cited

U.S. PATENT DOCUMENTS

| | | | | |
|---|---|---|---|---|
| 2005/0033504 A1* | 2/2005 | Rennels | ........... | G08G 1/096716 701/117 |
| 2005/0215269 A1* | 9/2005 | Cheok | ................. | G01S 5/0284 455/456.1 |
| 2007/0143017 A1* | 6/2007 | Reich | ..................... | G01C 21/26 701/469 |
| 2007/0167224 A1 | 7/2007 | Sprogis | | |
| 2009/0170580 A1 | 7/2009 | Emalfarb | | |
| 2009/0227374 A1 | 9/2009 | Tirpak et al. | | |

OTHER PUBLICATIONS

Howitt, Doran. "Electronic Mail by FM Waves". InfoWorld, Jul. 29 1985. pp. 20-21.

Undisclosed (CDTV.net), "Dr. Pepper Hunt for More Gives Clue-Solving Consumers a Chance to Win $1,000,000", http://cdtv.net/users/node/10919, 2007, CDTV.net, United States.

Undisclosed (PRNewswire), "23-Year-Old Houstonian is Americas Newest Millionaire by Finding Dr. Pepper Coin at Sam Houston Park", http://multivu.prnewswire.com/mnr/drpepper/27126/, Feb. 23, 2007, PRNewswire, United States.

Garmin Introduction to Geocaching, Part No. 190-00252-00 Rev. A, Copyright 2001.

\* cited by examiner

DIVIDED TRANSMISSION OF GPS COORDINATES

CROSS REFERENCE TO RELATED PATENTS

The present U.S. Utility Patent Application claims priority pursuant to 35 U.S.C. § 120 as a continuation of U.S. Utility application Ser. No. 12/569,375, entitled "PROMOTION USING GEOPOSITIONING TECHNOLOGY," filed Sep. 29, 2009, which claims priority pursuant to 35 U.S.C. § 119(e) to U.S. Provisional Application No. 61/101,452, entitled "PROMOTION USING GEOPOSITIONING TECHNOLOGY," filed Sep. 30, 2008, both of which are hereby incorporated herein by reference in their entirety and made part of the present U.S. Utility Patent Application for all purposes.

BACKGROUND OF THE INVENTION

1. Technical Field of the Invention

The present disclosure relates generally to transmitting GPS coordinates, and more particularly to splitting transmission of GPS coordinates between multiple transmission media.

2. Description of Related Art

Geocaching is an activity in which geocachers search for hidden objects, sometimes known as geocaches, using global positioning system (GPS) receivers. Typically, a geocacher obtains coordinates representing the geolocation of a hidden object from a website listing available geocaches, or from a similar source. The geocacher can then enter the coordinates into his GPS device, which provides directions to the geocache. In some cases, the geocacher must determine the coordinates by solving puzzles, riddles, or the like.

Geocaching has been used by at least one vehicle manufacturer to promote its line of vehicles. In that case, the vehicle manufacturer asked participants to find a geocached miniature vehicle attached to a tag having a bar code and corresponding number. Geocachers were instructed to access a web site and input the number on the tag as proof that the geocache had actually been found. In this promotion, like other conventional geocaching activities, geocachers typically obtained the coordinates of the geocache from a web site, and entered those coordinates into their GPS devices manually.

BRIEF SUMMARY OF THE INVENTION

A method according to some embodiments comprises encoding information associated with a geographic location in an electromagnetic medium and transmitting the information to a mobile device that includes a GPS receiver. This information can include, for example, partial or complete coordinates specifying the geolocation.

In some embodiments, information associated with the geographic location is broadcast to multiple mobile devices that each include GPS receivers. Various implementations can embed the information in a commercial radio transmission or broadcast, for example in a sideband of a broadcast channel, or within a high definition (HD) or radio data system (RDS) broadcast signal. In various embodiments, some or all of the information associated with the geolocation of a geocache can be pre-loaded, or stored, in a memory of a mobile device prior to the mobile device being provided to a user.

Information in addition to the originally transmitted information can also be provided to mobile devices via a website. This information can, in some cases, be provided via a browser plug-in, which can be configured to allow a mobile device having GPS functionality to obtain the information directly from the website.

Various embodiments can be implemented as a system, or as a program of executable instructions including at least one instruction to use the wireless transceiver to obtain additional information related to the geolocation of the geocache via the wireless transceiver. In some instances, program of executable instructions including at least one instruction to connect to a web site to obtain additional information related to the geolocation of the geocache is also stored in the memory of the mobile device.

BRIEF DESCRIPTION OF THE SEVERAL VIEWS OF THE DRAWING(S)

Aspects of this disclosure will become apparent upon reading the following detailed description and upon reference to the accompanying drawings, in which like references may indicate similar elements:

FIGS. 3-7 are pictorial representation of various web pages included in a website for geopositioning-based promotion;

DETAILED DESCRIPTION OF THE INVENTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Geopositioning generally refers to specifying or identifying a location on the earth by using a coordinate system that may include but is not limited to latitude, longitude, and elevation. Geopositioning technology may include but is not limited to global positioning system ("GPS") devices by such makers as Garmin™, Tom-Tom™, Magellan™, Mio™ or Navigon™, and other devices capable of geopositioning, such as personal digital assistants (PDA), cellular phones or other cellular devices, radio frequency identification devices (RFID).

Figure 1:
FIG. 1 is a diagram illustrating embodiments of a system for geocaching using GPS receivers or terrestrial mobile communication systems.

Referring to FIG. 1, a GPS may utilize twenty-four satellites 21 placed in six orbital planes equally spaced and inclined at an angle relative to the equatorial plane of the earth 25. The satellites 21 may transmit and receive communication signals such as microwave signals, radio frequency signals, or any combination thereof. The satellites 21 are typically placed in medium earth 25 orbit that repeat the same orbit over the earth's 25 surface on a regular basis providing continuous coverage of the earth's 25 surface. The multiple satellites' 21 repetitive orbits and equal spacing allow a GPS receiver on the earth 25 to receive the communication signals from multiple satellites 21 at any point on the earth's 25 surface. For instance, a GPS receiver in Cairo, Egypt may be receiving communication signals from four initial satellites 21 at 8 a.m., then from four different satellites 21 at noon as the earth 25 rotates and the four initial satellites 21 orbit to the other hemisphere of the earth 25. However, because of the spacing and orbit of all the multiple satellites 21, there may always be some multiple satellites 21 broadcasting communication signals to Cairo, Egypt.

The communication signals from multiple satellites 21, preferably three, may then be used to mathematically determine a GPS receiver's location on the earth 25 using triangulation (using angular measurements), trilateration (using geometric measurements), or other suitable techniques. A fourth satellite 21 may be required to provide a time variable, e.g., the time it takes a communication signal to travel through space and the earth's 25 atmosphere to reach the earth's 25 surface. This time variable may be compared with other satellites 21 and the GPS receiver's time to determine the GPS receiver's location on the earth 25. Of course, additional satellites 21 may be used to calculate the GPS receiver's location on the earth 25 as needed.

Additionally, personal digital assistants (PDA), cellular phones, or other suitably-programmed devices may operate as GPS receivers. Still referring to FIG. 1, geopositioning technology provided in personal digital assistants (PDA), cellular phones, or other cellular devices may, in addition or alternative to GPS, utilize terrestrial mobile communication systems that use fixed base stations 23. Examples of terrestrial mobile communication systems that utilize fixed base stations 23 include b frequency division multiple access (FDMA)- and code division multiple access (CDMA)-based systems, global system for mobile communications (GSM), and personal communication systems (PCS). The fixed base stations 23 may be wireless communications stations installed at fixed locations that allow cellular devices to transmit and receive communication signals with other cellular devices, land-line devices such as land-line telephones, or even the Internet. Typically, the fixed base stations 23 allow cellular devices to communicate with other land-line telephones or other cellular devices by interfacing with the public switched telephone network (PSTN) and allow cellular devices to communicate with the Internet by selecting an access point by interfacing, for example, with the GRPS Core Network found in GSM communication networks. Of course, other suitable methods such as microwave radio or other switching technology may allow a cellular device to communicate with other land-line devices or the Internet.

The fixed base stations 23 may be spaced throughout a geographic area such that one or more cellular devices in a geographic area may transmit or receive communication signals with at least one fixed based station 23 at all times. Large geographic areas may be split up into smaller fixed base stations 23 (cell sites or cellular sites) to deal with problems, such as line-of-sight signal loss due to elevation or curvature of the earth 25, and to increase communication capacity. As the cellular device travels through a geographic area, the cellular device may "switch" or "handoff" communication traffic to another cell site that may be closer or provide a stronger communication signal to the cellular device. It should be noted that while the cellular device travels through a geographic area, there may be multiple fixed base stations 23 that may transmit or receive communication signals from the cellular device, but usually only the cell site with the strongest signal or that is closest to the cellular device maintains communication. Of course, there may be other methods that terrestrial mobile communication systems may use to maintain communication with cellular devices as they travel through geographic areas.

The communication signals transmitted or received from one or more cellular devices to fixed base stations 23 may then be used to mathematically determine a cellular device's location that may include but is not limited to a city, neighborhood, sector, latitude or longitude, or any other suitable coordinate system by determining the distance from multiple fixed base stations 23 and applying triangulation or other suitable techniques. It should be noted that the accuracy of geopositioning using terrestrial mobile communication systems may be limited to the concentration of fixed base stations 23 in a given geographic area. For instance, in a high urban geographic area where a large concentration of fixed base stations 23 exist, a higher resolution of geopositioning may be available because the distance of any given cellular device may be measured against many, relatively close together fixed base stations 23. In a rural geographic area where the fixed base stations 23 may be spread out in less concentration, triangulation of the cellular device may have to be calculated with fewer measurements using fewer fixed base stations 23 providing less accurate geopositioning.

"Geocaching" generally refers to an activity that involves hiding, placing, or storing an item anywhere in the world, and publicizing the item's location to allow people to find the item using geopositioning technology, such as GPS receivers or cellular devices. A "cache" generally refers to the location where an individual or organization (a "cache owner") hid, placed, or stored the item. A "geocacher" generally refers to a "cache owner," or to the person that tries to find the item using geopositioning information. A cached item may include information about the cache owner, such as a digital or analog logbook, or about geocachers who previously found the cached item.

There are many types of geocaching. A traditional cache may simply include container and a logbook for geocachers to record their activity. A cache may further include a Travel Bugs® dog tag or Geocoin that may be trackable from cache to cache. For example, an organization or individual may cache a consumer item, such as a t-shirt along with a Travel Bug® attached, in San Antonio. A geocacher may find the t-shirt with the attached Travel Bug® dog tag, travel to Houston, and cache the t-shirt and attached dog tag in Houston. The organization or individual may be able to track that the t-shirt with attached Travel Bug® traveled from San Antonio to Houston, and further track any future movement of the Travel Bug®.

In another example, a geocacher may establish an Earthcache, which generally refers to a location that provides an educational lesson involving a unique geoscience feature on-the-ground. In yet another example, a Cache In Trash Out (CITO) geocaching event may provide a way for geocachers to contribute to the beautification of local parks and lands by coordinating geocachers for trash pickup. Letterboxing is another form of geocaching that may use clues to direct geocachers to a hidden container. The hidden container may have a rubber stamp and logbook inside. A geocacher may carry a personal rubber stamp and personal logbook, and, upon finding the hidden container, may stamp her personal logbook with the rubber stamp in the hidden container and further stamp the logbook in the hidden container with her personal rubber stamp.

In other examples, Mystery or Puzzle Caches may involve complicated puzzles that a geocacher will first need to solve in order to determine the coordinates. Offset Caches may provide an initial cache that further provides information that encodes a final cache geoposition. For example, an Offset Cache may involve an initial cache that contains a plaque where the digits of a date on the plaque correspond to coordinates for a final cache that a geocacher must find. Other examples of an Offset Cache include but are not limited to the published coordinates of an existing historical monument, plaque, or even a benchmark that a cache owner would like to have a geocacher visit. From this site a geocacher may look around and find offset numbers stamped or written in or on some part of the marker site, or continue geocaching based on instructions posted online, such as at www.geocaching.com. Multi-Caches may involve a first cache that includes coordinates (or partial coordinates) to a next location, or multiple caches that include hints to a final cache. Virtual caches may involve caches that are existing landmarks, such as a tombstone or statue. A geocacher may answer a question from the landmark and let the cache owner know as proof that the geocacher was there.

Figure 2:
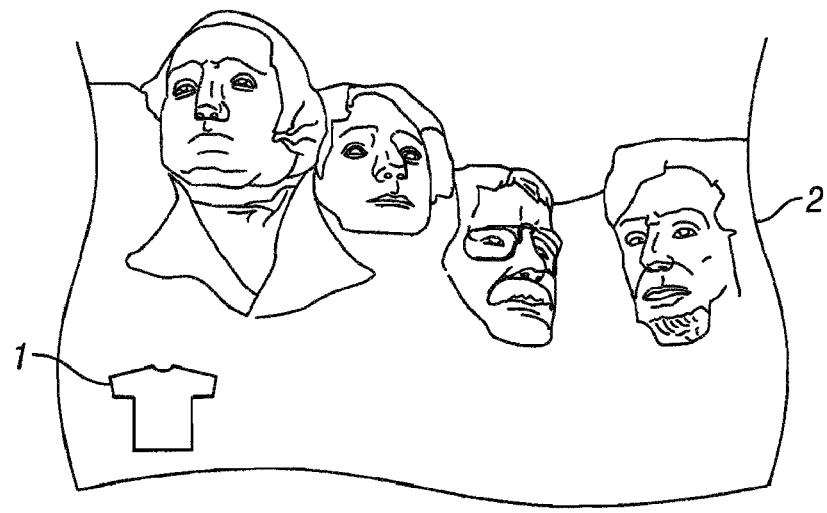
FIG. 2 is a diagram illustrating embodiments of a system and method for using geocaching for promoting goods and services.
Figure 2:
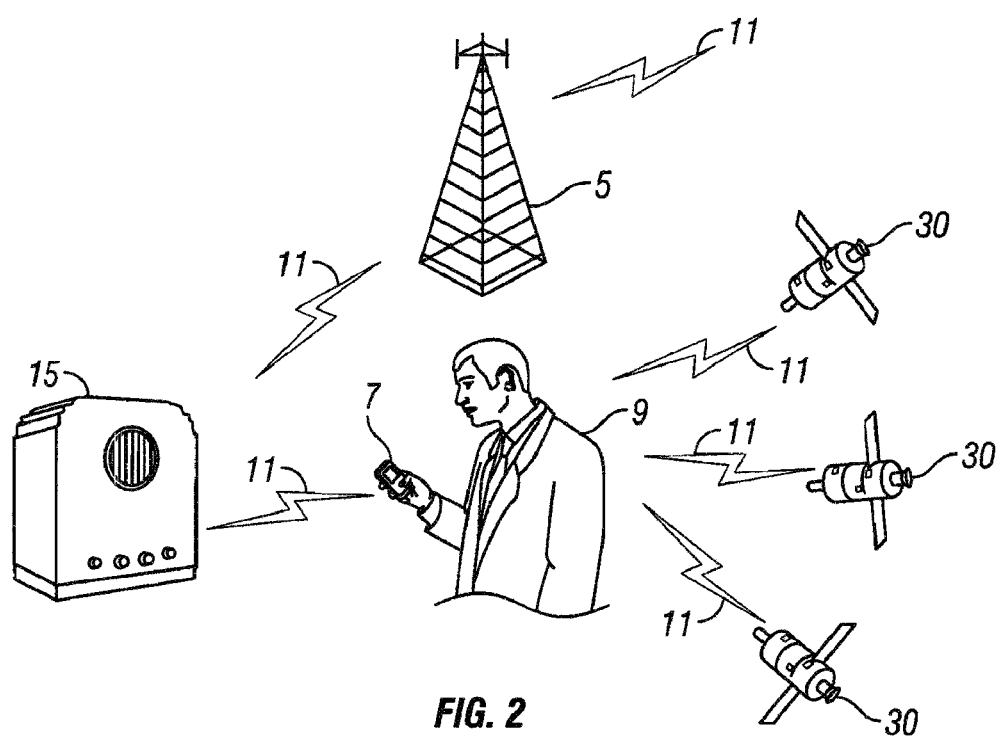

FIG. 2 illustrates an embodiment of promoting goods and services using geopositioning technology. FIG. 2 includes a consumer item 1 which may include but is not limited to, apparel such as a pair of shoes, recreational items such as a fishing boat, consumer electronics, a music video, a coupon, beverages, concert items such as tickets to an event, sporting event items such as tickets to a game, or monetary prizes. The consumer item 1 may be geocached by a cache owner and assigned the geoposition location of the cache. In one embodiment, the consumer item 1 may be cached at Mt. Rushmore 2 and assigned the respective geoposition location. Of course, the consumer item 1 may be cached anywhere on the earth 25 and therefore an infinite amount of coordinates are available by geopositioning the consumer item 1.

Next, the consumer item 1 may be described in a promotion of a vendor, radio station, business, or other suitable entity that may be promoting the item or some other good or service. Information, such as geocaching information about the consumer item 1 may be broadcast 11 or distributed via radio 15, television, internet, print, or any other suitable media 5. Consumers 9 or geocachers may receive the information about the consumer item 1 and use the information to locate the consumer item 1 using geopositioning technology. For example, a consumer may rely on a GPS device in communication with GPS satellites 30.

Of course, the consumer item 1 may itself contain an advertisement of multimedia content, such as a website from which a consumer 9, or geocacher, may download music. Consumer item 1 may be a promotional gift for loyal listeners of a particular radio station, or a reference to a website that provides access to promotional multimedia content.

In another embodiment, an enhanced radio station promotion may be transmitted, e.g. broadcast, via a suitable media to promote a consumer item or service. The consumer item can be cached and identified by a geoposition location. Consumers or geocachers may receive the cache location information via radio, television, internet, print or any other suitable media 5, and use the location information to locate the consumer item using geopositioning technology such as a GPS receiver or a cellular device. For example, a radio station may promote a concert for George Strait and geocache coupons at various locations for a free compact disc of George Strait redeemable at the radio station 27. The radio station 27 may broadcast 11 geocaching information for the multiple coupons to listeners, who may then use geopositioning technology to locate the coupons. After locating the consumer item 1, a listener may then return the coupon to the radio station 27 and receive a free compact disc of George Strait.

Figure 3:
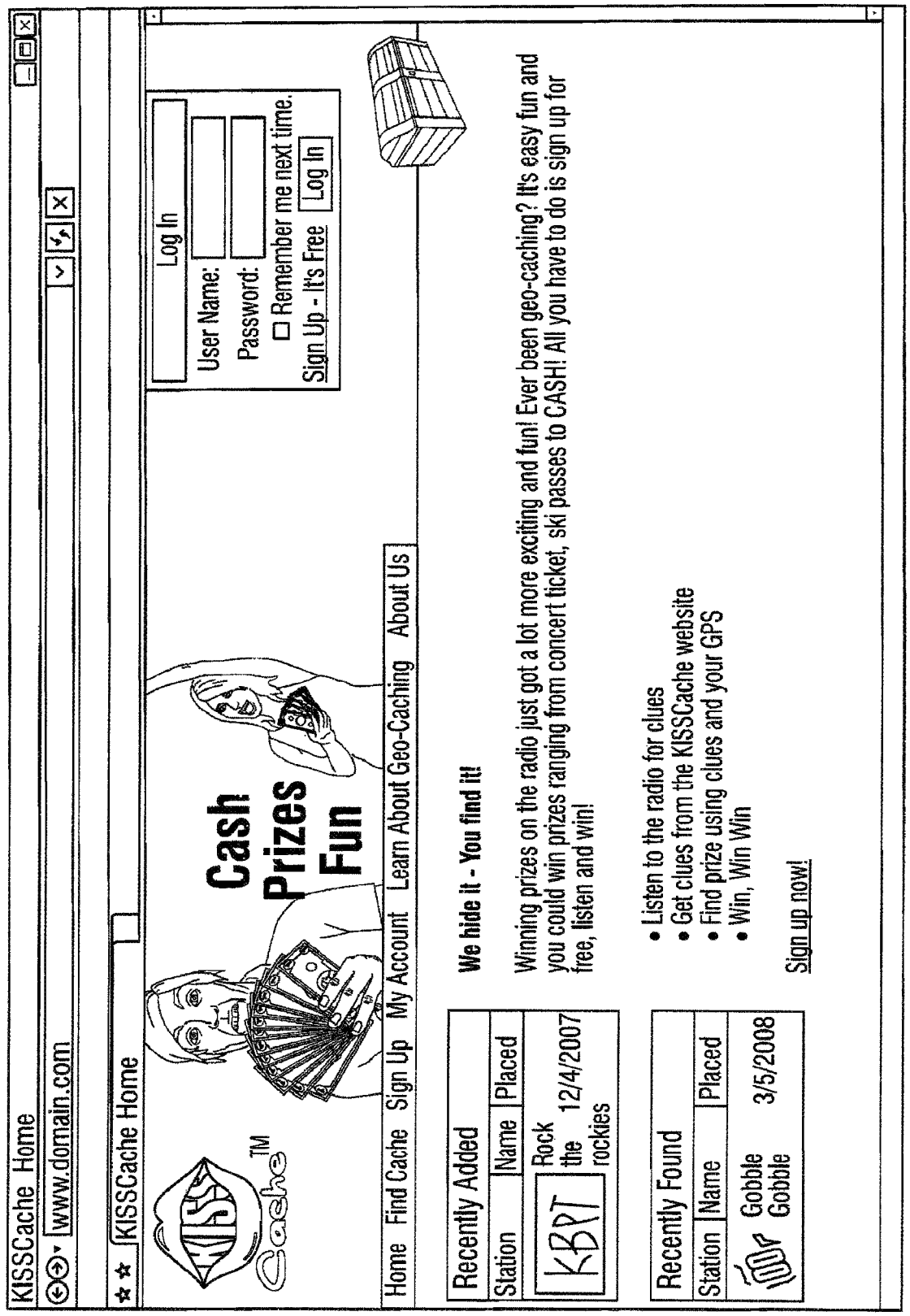
Figure 4:
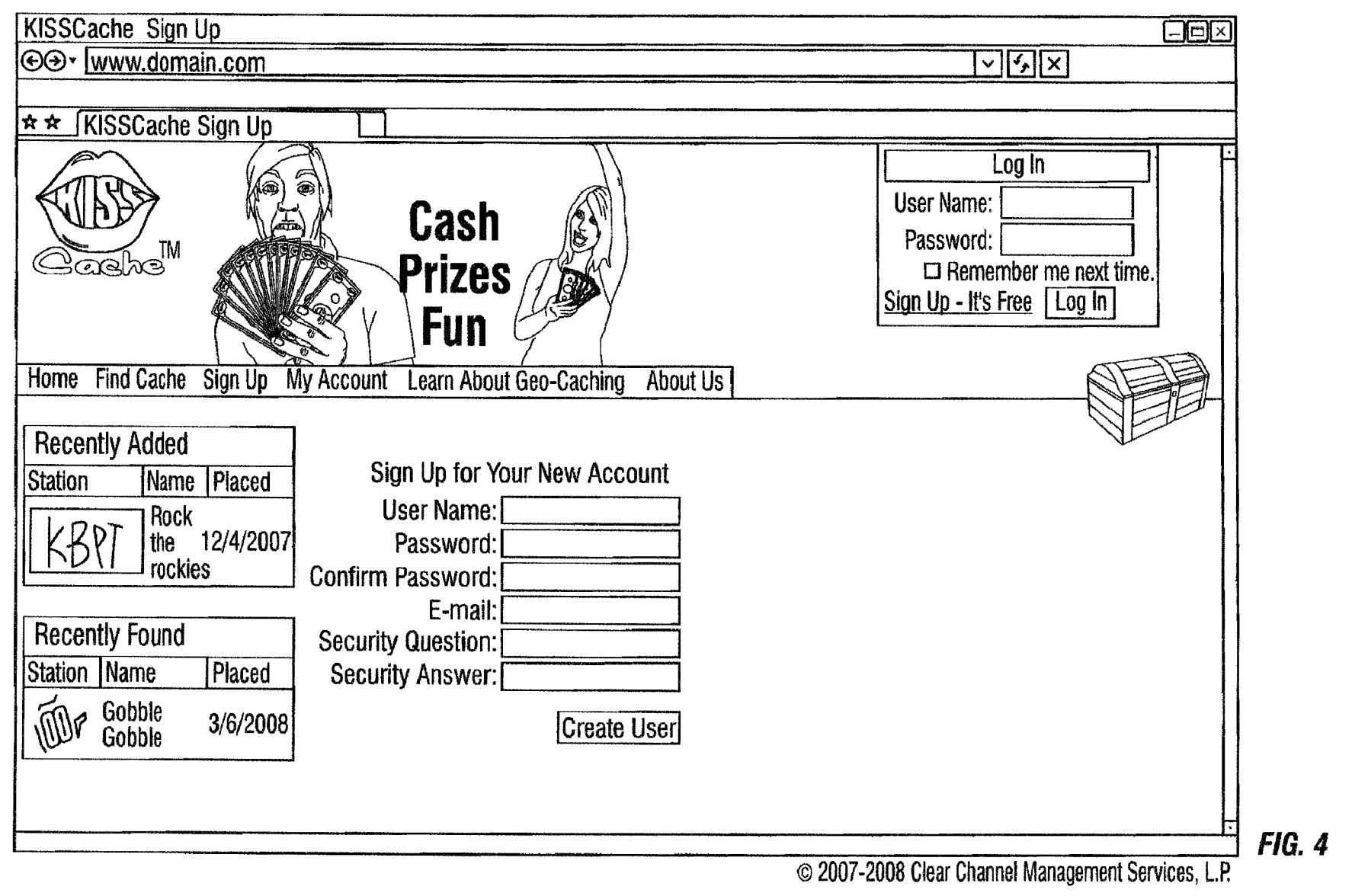
Figure 5:
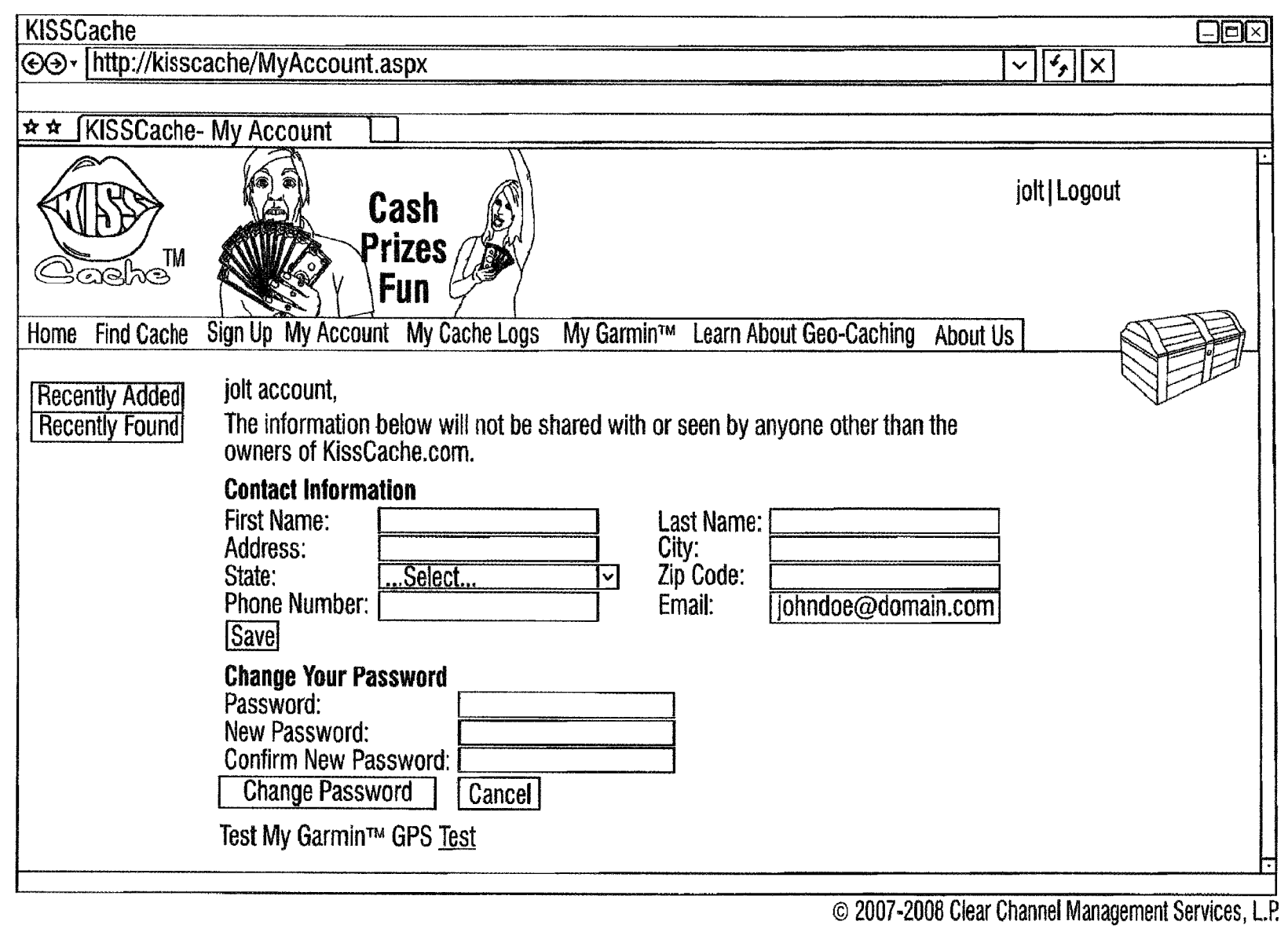

Referring next to FIGS. 3-8, various pages of a web site are discussed according to embodiments of the present disclosure. As illustrated by FIG. 3, a geocacher can be introduced to a geopositioning-based promotion via an introductory web page. The introductory web page can include various marketing messages, user input options, and other desired content. As illustrated by FIG. 4, a sign-up page can be presented to a geocacher to allow the geocacher to establish an account with the promoter. The web page illustrated in FIG. 5 can be provided to allow a geocacher to manage her account.

Figure 6:
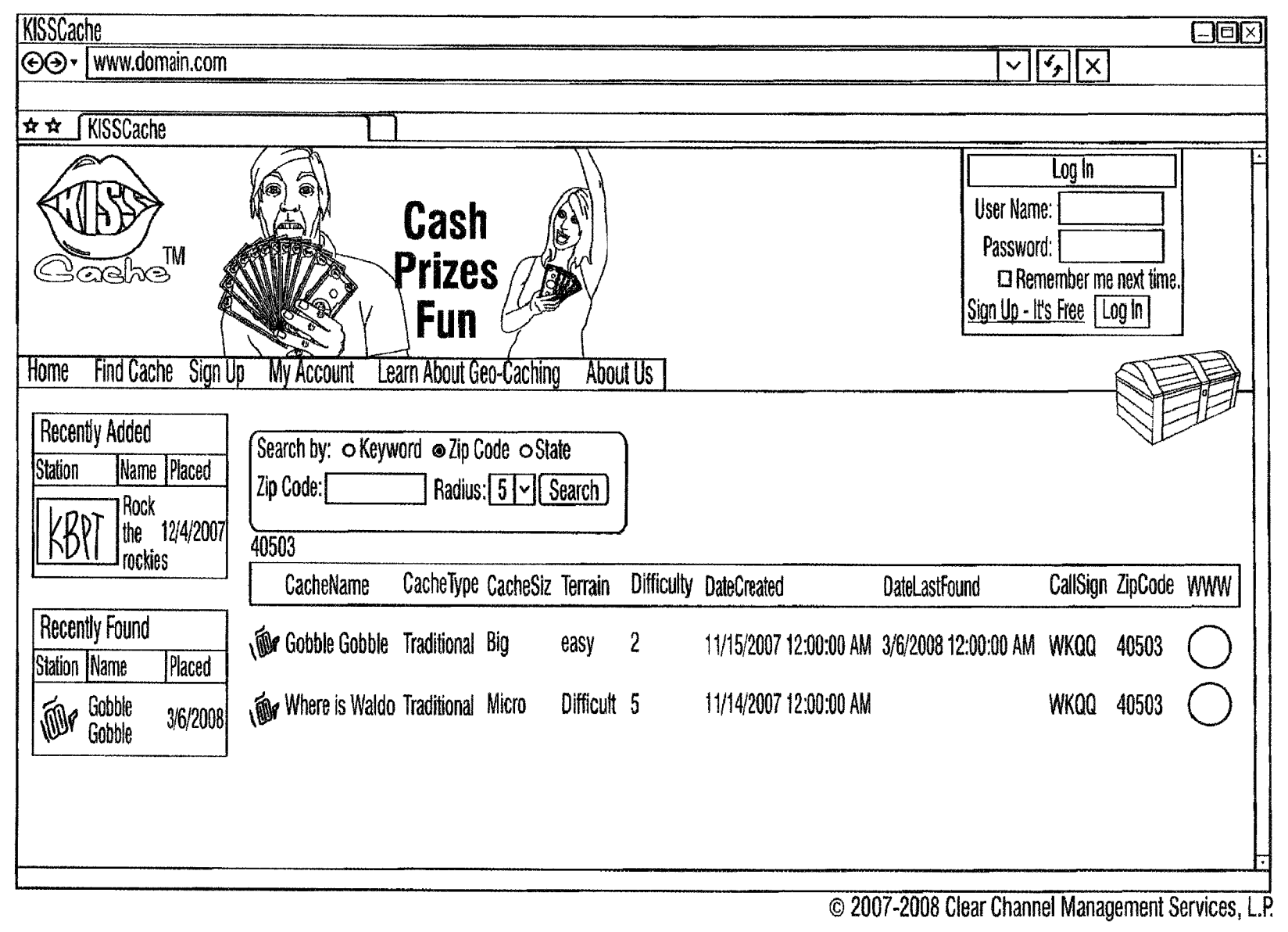
Figure 7:
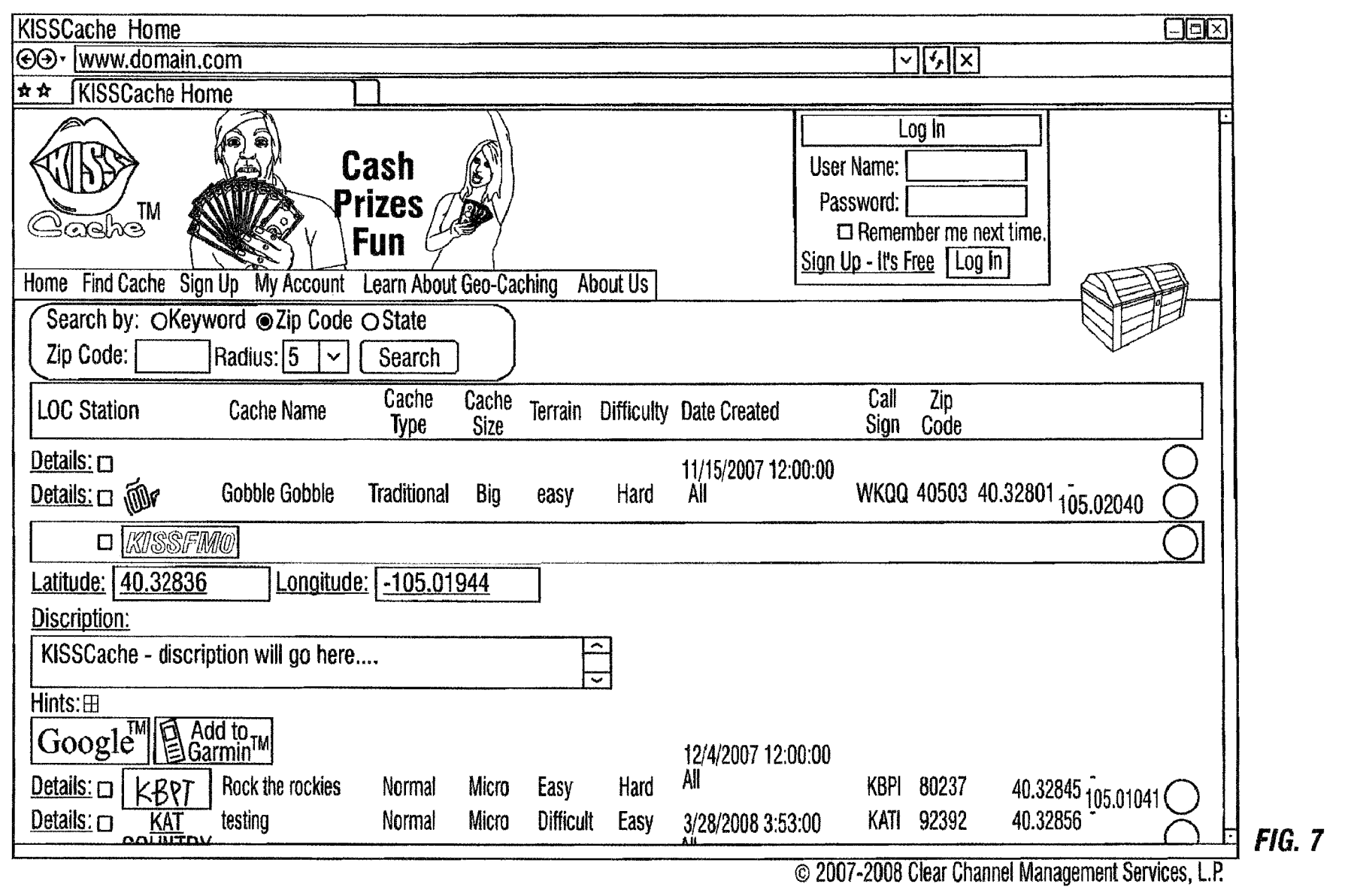
Figure 8:
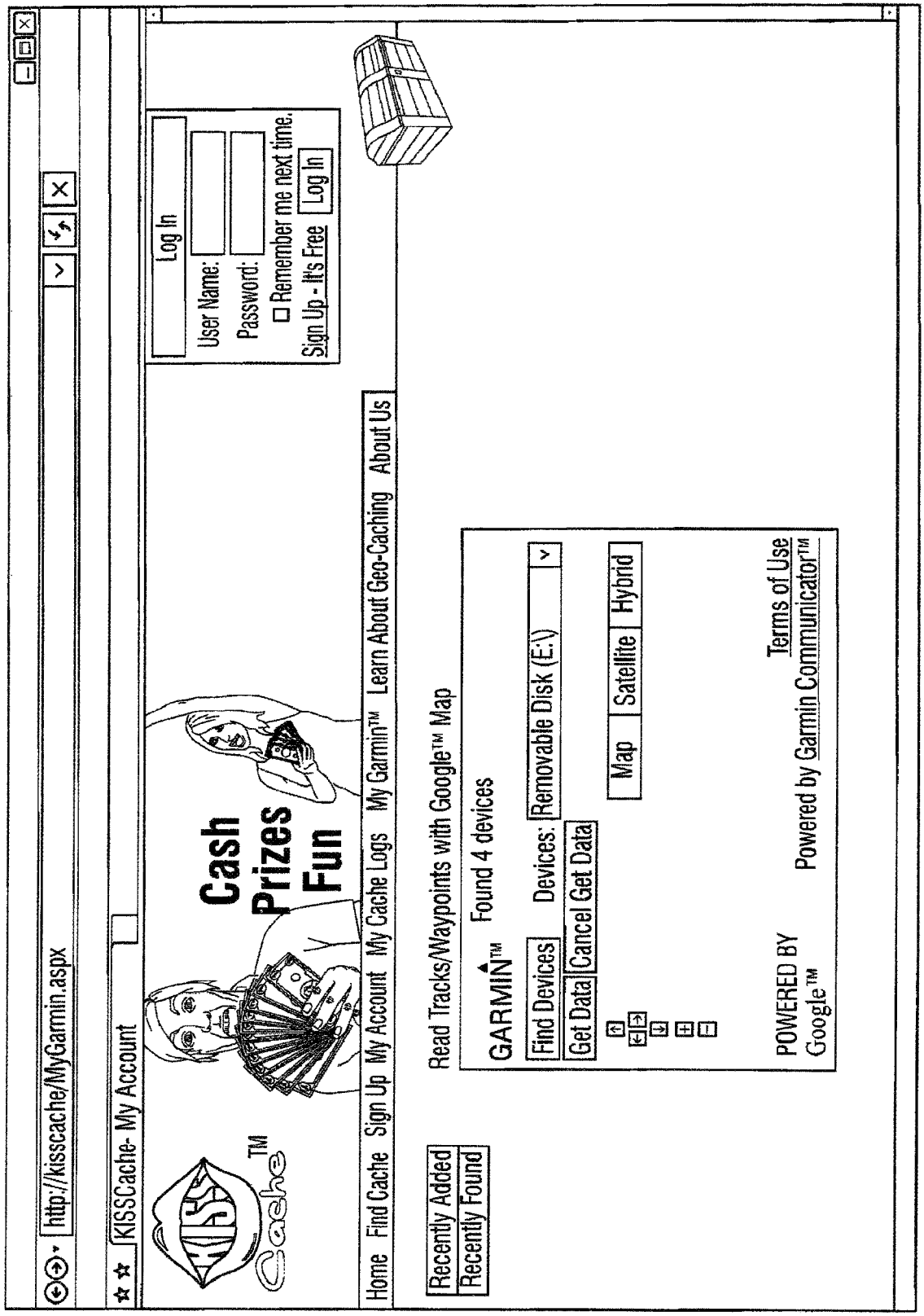
FIG. 8 is a diagram illustrating a web page employing a GPS plug-in for geopositioning-based promotion.

As illustrated by FIG. 6, a web page can be provided to permit a geocacher to search for and view geocaches in her area. The web page illustrated in FIG. 7, illustrates that a promoter, such as a radio station, can create a geocache promotion by providing a description of the geocache along with its location coordinates. FIG. 8 illustrates a web page that allows a promoter to provide plug-ins for popular GPS devices to allow geocachers to connect their GPS devices to a promoter's web site.

Consider the following example of a radio station promotion including a web site and various web pages, as illustrated in FIGS. 3-8. A radio station can provide a website that lists a number of active promotional caches for promoting the radio station itself, or for promoting third party goods or services such as the following: concert tickets promoting a certain singer; compact discs promoting an event; free digital music downloads of a particular band; a free car wash promoting a charitable organization; or free ski passes promoting the respective website or affiliate company.

Geocachers can receive information concerning the consumer item or service via the website and use the information to locate the consumer item, or service, or both. For example, a website can broadcast a promotion for free mp3 downloads for the first one hundred people that find a cached code written on a piece of paper. The website can broadcast the geopositioning information to a code that has been geocached, and geocachers use geopositioning technology, such as a GPS receiver or cellular device, can attempt to find the cached code using the broadcast information. The geocacher may then be required to enter the code, when found, on the website to redeem the free mp3 download.

Consider another example of a promotion, in which a consumer item such as a free compact disc. The website can broadcast the geoposition of the cached compact disc, and geocachers then race to be the first to locate the compact disc. In some cases information broadcast to geocachers includes a riddle that must be solved in order to find the cached item, a telephone number to call, or a website to visit before receiving the geoposition information for the cached item.

The geoposition information received by the geocachers can be manually input into a geopositioning device, or may be broadcast directly to the geopositioning device without the geocacher having to manually input the information. For example, in some embodiments a GPS receiver, cellular device, or other suitable geopositioning device is configured to receive RD radio communication signals or streaming audio communication signals from the Internet. A radio communication signal broadcast by a radio station can include embedded geoposition information associated with a cached item The geopositioning device can receive the radio communication signal broadcast with the embedded geoposition information, thereby enabling a geocacher to find and locate the cached item. For example, a GPS receiver can provide driving directions for a programmed route, or update the driving directions with live traffic updates that are delivered via HD radio. In some embodiments, the GPS receiver can receive the radio communication signal broadcast via HD and incorporate it into a location-based set of live updates to the route suggested to the cached consumer item based on traffic conditions, weather, or any other suitable data. In some instances, the geopositioning information of a consumer item can be broadcast via HD radio directly to a geopositioning device. Location-based geocaching promotions and advertisements may thus be provided using the HD radio and GPS receiver method.

In some embodiments, a geopositioning device can use a web browser plug-in to access Google™ maps, or another mapping service, to locate consumer items. For example, Garmin, a GPS device maker, provides a plug-in called a "Garmin Communicator Plugin" that enables a geocacher to connect a Garmin GPS device to a website via an Internet-connected computer. As may be seen in FIG. 8, the plug-in can allow a website to provide geo-cache locations directly to a GPS device, and in some cases also allow collection of GPS movement information.

After a geocacher locates a consumer item, the consumer item can be used to offer a promotion to the geocacher that may result in a unique price or personalization. For example, the cached consumer item may be a coupon for an iPod™ redeemable at a radio station, and twenty downloads of mp3 music from a particular website for one dollar.

In some embodiments, a discount can be given to the geocacher for additional purchases of a consumer item, for purchases of similar goods or services, or for any suitable goods or services the promoter chooses. Again, the discount, unique price, or personalization can apply to any vendor or service, not just a consumer item. For instance, a cached consumer item may take the form of two free tickets to an amusement park, and a coupon for 50% off two additional tickets.

A consumer item can also include an embedded tracking device (not shown) that enables a promoter, vendor, or other business to track or store information about the geocacher, the consumer item, or a combination thereof. The tracking device can also be used to track or store information about how many consumer items were located during, and as a result of, a particular geocaching promotion.

The tracking device can also be used to track or store information about a particular vendor or service associated with a promotion. For example, a radio station or website promoting a new restaurant may cache a consumer item, such as a keychain, for a geocacher to locate using a geopositioning device. The keychain can be equipped with a tracking device, similar to a Travel Bugs dog tag, that enables the new restaurant to determine the number of geocachers in their respective geographic area who listen to the particular radio station or website, enabling the new restaurant to more effectively target their advertising budget.

In some embodiments, a tracking device can include a barcode, RFID, or other suitable device that can be used to track or store information related to a geocaching promotion. The tracking device can, in some cases, transfer stored information to a computer, database, PDA, server, memory or any other suitable information media, for processing, analysis, or later retrieval by the promoter, vendor, or other business.

In some implementations, a discount for a promotional item can be offered to a geocacher after the consumer item, service, or vendor is geolocated. For example, a website can be used to promote a new soft drink in a geocaching promotion by transmitting information related to a consumer item, such as a t-shirt, geocached in a grocery or convenience store. When the geocachers enter the store to find the cached t-shirt, the store owner can offer the respective geocacher a discount for the new soft drink being promoted. This may especially be useful if there are multiple geocache sites that a geocacher must find, with the final cache site is located at the grocery store, because by the time the geocachers arrive at the store they are likely to be thirsty.

In some embodiments, location-based geocaching promotion may be targeted to geocachers based on their coordinates or their physical location. For example, a geocacher in Arizona may not be allowed to participate in a geocaching promotion or advertisement in Texas promoting a Texas-based business, for example. Alternatively, the geocaching promotion or advertisement may have a time duration. For example, a geocaching promotion or advertisement may only be effective in Texas from July 1st until July 4th.

Some variants of geopositioning-based promotion can utilize "circle of influence" information to match the geocacher's location with the general area of the promotion or advertisement. For example, a website promoting a car dealership in Dallas may cache a consumer item, such as raffle tickets for a new car, in Dallas. To target geocachers in the "circle of influence" of Dallas, the website may request a geocacher's zip code before providing the geopositioning information to locate the cached raffle tickets.

Some embodiments can be implemented as a geopositioning device that contains software enabling a geocacher to select the desired information for a geocaching promotion or advertisement using, e.g. an on-demand display. Use of an on-demand display can include, but is not limited to, displaying the geoposition location of a cached consumer item, service, or vendor. A geopositioning device according to some embodiments can continuously monitor geolocation information, but only display information to the consumer or geocacher when selected using the on-demand display. For example, not all users of a geopositioning device may want to participate in geocaching promotions or advertising. If a consumer or geocacher wishes to participate, she may select an on-demand display on the geopositioning device that contains preset geocaching promotions of advertisement.

Geolocation or other information can be pre-loaded into a memory of a mobile GPS device in some embodiments. For example, a car dealership may wish to promote a new model of car, by providing a free geopositioning device that contains information about prizes that have been geocached throughout a city or other region, e.g. gift cards for fifty dollars' worth of gas cached throughout a city. A new car buyer can participate in the promotion by utilizing the free geopositioning device to locate the cached gift cards.

Figure 9:
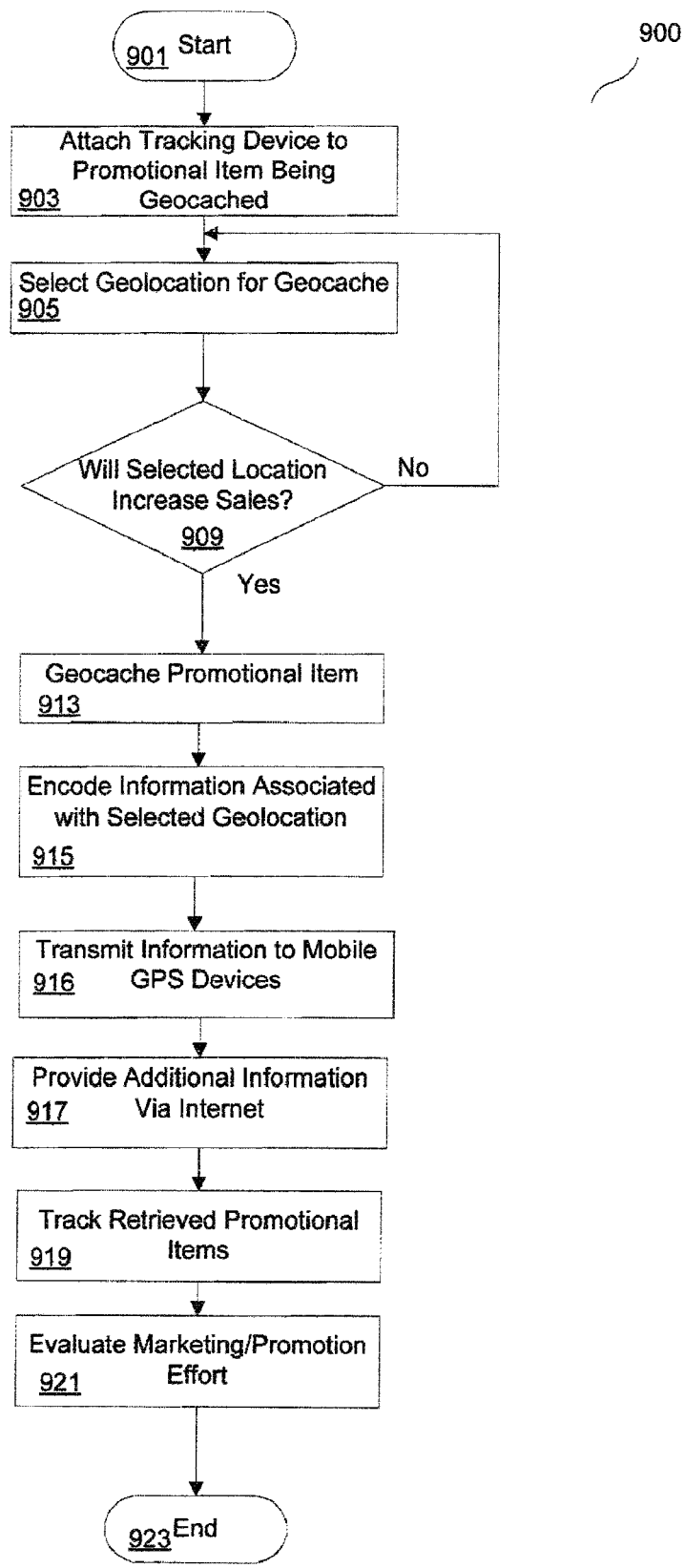
FIG. 9 is a flow chart illustrating a method according to an embodiment of the present disclosure.

Referring next to FIG. 9, method 900 will be discussed according to various embodiments of the present disclosure.

Method 900 begins at block 901 and proceeds to block 903. As illustrated at block 903, a tracking device can be attached to one or more promotional items, products or goods for later use in tracking the goods after they have been removed from a geocache. In some embodiments, the tracking device can be activated when the product or good to which it is attached is removed from the geocache. In other embodiments, the tracking device may be activated upon placement of the promotional item within the geocache.

The tracking device can be physically attached to the promotional device in various different ways, with certain methods that may be more useful depending on the nature of the promotional item. For example, if the item being geocached is an article of clothing, it may be desired to sew or glue an RFID tag or chip to the item, while if the item is hard, such as a baseball, car keys, or the like, a tracking device can be attached via an external attachment mechanism such as a chain, or included in the packaging. In some embodiments, the tracking device may be a bar code, password, or other identifier that can be manually entered, scanned, or otherwise used to identify a particular promotional item.

As illustrated at block 905, a desired geolocation can be selected at which to geocache the promotional item. Various different locations can be selected to enhance the geocaching experience, and can include locations chosen for their proximity to various features of interest to an advertiser and participating geocachers. In some embodiments, a geocaching location can be chosen to provide a marketing advantage to the same or another advertiser, such as may be the case where a refreshments vendor desires to be located near the geocache. To add to the difficulty and fun of a particular challenge, a vendor known to have been located near a geocache in the past can be positioned at an alternate location to induce geocachers to believe that they have correctly arrived at the proper geolocation, when in fact they have not.

As illustrated at block 909, a determination can be made regarding whether the selected geolocation is likely to have the desired increase in sales of a target product, which may be different from, but still related to, the geocached promotional item. For example, if an mp3 player is the geocached promotional item, then the goal may be to increase sales of various mp3 accessories such as carrying cases, batteries, or the like. The determination can also include historical data collected from previous marketing efforts.

If it is determined at block 909 that the selected geolocation does not provide the desired increase in sales, method 900 can return to block 905 for selection of another location. If the selected geolocation is acceptable, the promotional item can be geocached, as illustrated at block 913.

As illustrated at block 915, information associated with the geolocation of the geocached promotional item can be encoded for transmission via an electromagnetic medium. In at least one embodiment, the encoding can include amplitude modulation, frequency modulation, phase shift modulation, and any number of other similar modulation techniques. Encoding the information can also include formatting the information for use by a mobile device including GPS capability. Such devices can include stand-alone GPS devices, such as those commonly included in automobiles or carried by orienteering and geocaching participants, commercially available wireless telephones including GPS capabilities, and other suitable devices.

By encoding the information in a format that is readable by such mobile GPS devices, information can be sent directly to the device, without requiring manual entry of coordinates. In some embodiments, manual entry can still be used as desired. The information sent to the mobile devices can include full or partial GPS coordinates indicating the geolocation of a geocache. In other embodiments, the information includes secondary information that can be used by a geocacher to identify the geolocation.

As illustrated at block 916, the information can be transmitted to the mobile devices. In some embodiments, the information can be transmitted, e.g. broadcast, over a commercial radio or television station using various techniques known to those skilled in the art to encode the information in channel sidebands, or in HD or RDS radio transmissions. Various other encoding techniques and methods can also be used. In some such embodiments, the acts of transmitting and encoding can overlap, as for example, the case where encoding includes modulation.

The information transmitted to the mobile GPS devices can, in some cases, be insufficient to fully identify the geolocation of the geocache. In some such embodiments, further information can be obtained via a different medium, or in subsequent transmissions via the same medium. For example, different portions of the necessary geolocation can be broadcast at the same time on different days of the week to entice geocachers to listen to a particular drive-time radio show. As illustrated at block 917, in some embodiments a portion of information necessary to determine the geolocation of the geocache can be transmitted, for example by a radio broadcast, while additional information needed to fully determine the geolocation is obtained through an Internet web site.

In some such embodiments, a web browser plug-in can be provided to allow the mobile device to connect directly to the website, and obtain the additional information related to the geolocation of the geocache. For example, a geocacher can connect his cellular telephone or other mobile GPS device to a web site. If the GPS device has received a code during a radio broadcast, the GPS device can use that code to access further information from the web site. Other methods of accessing the additional information from a website can also be employed consistent with the teachings set forth herein.

As illustrated at block 919, a tracking device that was attached to a promotional item retrieved from the geocache can be used to track the movements of the promotional item. For example, if an RFID tag sewn into a shirt comes within range of an RFID reader in a clothing store that sponsored a promotion in which that clothing store geocached the shirt with the RFID tag, that store owner can determine that the geocached promotional item has made its way back to the store. In some embodiments, the tracking device can download information indicating its own movement history to a server or otherwise.

As shown at block 921, the tracking information can be used to evaluate the effectiveness of an advertising, or promotional, campaign. For example, if a large number of geocached promotional items are tracked back to a store running the promotion, then it can be inferred that the marketing effort was successful. Other criteria based on tracking of geocached promotional items can be used consistent with business objectives and as otherwise desired.

Method 900 ends at block 923, although additional operations, such as report generation, and various iterative evaluation and geolocation selection operations can also be included in other embodiments.

Figure 10:
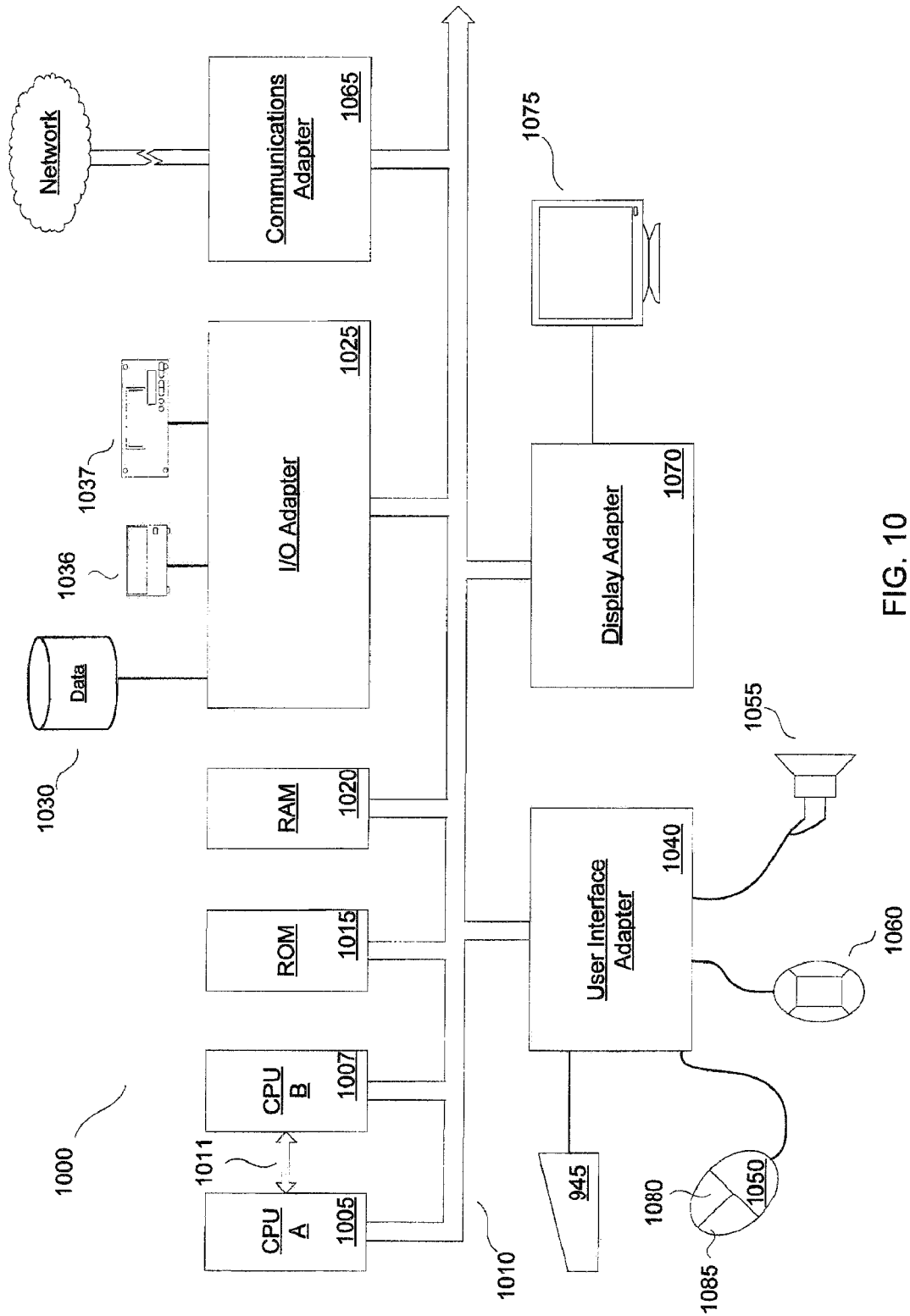
FIG. 10 is a high level block diagram of a processing system according to an embodiment of the present disclosure.

Some or all of the methods and processes described herein can be embodied in or performed by one or more processing systems. An example of such a processing system is discussed with reference to FIG. 10. Processing system 1000 includes random access memory (RAM) 1020; read-only memory (ROM) 1015, wherein the ROM 1015 could also be erasable programmable read-only memory (EPROM) or electrically erasable programmable read-only memory (EEPROM); and input/output (I/O) adapter 1025, for connecting peripheral devices such as disk units 1030, optical drive 1036, or tape drive 1037 to system bus 1010; a user interface adapter 1040 for connecting keyboard 1045, mouse 1050, speaker 1055, microphone 1060, or other user interface devices to system bus 1010; communications adapter 1065 for connecting processing system 1000 to an information network such as the Internet or any of various local area networks, wide area networks, telephone networks, or the like; and display adapter 1070 for connecting system bus 1010 to a display device such as monitor 1075. Mouse 1050 has a series of buttons 1080, 1085 and may be used to control a cursor shown on monitor 1075.

It will be understood that processing system 1000 may include other suitable data processing systems without departing from the scope of the present disclosure. For example, processing system 1000 take the form of mobile device, such as a wireless telephone or GPS receiver. In some such embodiments, communications adapter 1065 can be used to interface with a wireless telephone network, and can also be adapted to receive GPS signals.

Various disclosed embodiments can be implemented in hardware, software, or a combination containing both hardware and software elements. In one or more embodiments, the invention is implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, or other suitable instruction execution system.

Various embodiments have been described for delivering content related to a commercial media program. Other variations and modifications of the embodiments disclosed may be made based on the description provided, without departing from the scope of the invention as set forth in the following claims.

What is claimed is:

1. A method comprising:
   encoding information associated with a geographic location in a sideband channel of a first transmission medium, wherein:
      encoding the information includes encoding the information in a format readable by a mobile device including a GPS receiver;
      the information including first partial global positioning system (GPS) coordinates, the first partial GPS coordinates insufficient by themselves to completely identify the geographic location;
   transmitting, via the sideband channel of the first transmission medium, the first partial GPS coordinates to the mobile device; and
   transmitting at least second partial GPS coordinates to the mobile device via a second transmission medium, wherein the first partial GPS coordinates and the at least second partial GPS coordinates are sufficient, when combined, to fully identify the geographic location.

2. The method of claim 1, wherein:
   the first transmission medium includes a sideband of commercial radio station.

3. The method of claim 1, wherein:
   the second transmission medium includes a wide area network.

4. The method of claim 3, further comprising:
   establishing an Internet connection between the mobile device to a website; and
   transmitting the at least second partial GPS coordinates directly to the mobile device via the Internet connection, without requiring manual entry of coordinates.

5. The method of claim 4, wherein:
   establishing the Internet connection includes using a code received by the mobile device during a radio broadcast.

6. The method of claim 1, wherein transmitting at least second partial GPS coordinates to the mobile device includes:
   transmitting, to the mobile device, a location-based set of live updates to a travel route currently displayed on the mobile device.

7. The method of claim 1, wherein:
   the mobile device is configured to receive an Radio Data System (RDS) broadcast signal; and
   the at least second partial GPS coordinates are received in the RDS broadcast signal.

8. A system comprising:
   a processor;
   memory coupled to the processor, the memory storing a program of instructions which, when executed, configure the processor to:
      encode information associated with a geographic location in a sideband channel of a first transmission medium, wherein:
         encoding the information includes encoding the information in a format readable by a mobile device including a GPS receiver;
         the information including first partial global positioning system (GPS) coordinates, the first partial GPS coordinates insufficient by themselves to completely identify the geographic location;
      transmit, via the sideband channel of the first transmission medium, the first partial GPS coordinates to the mobile device; and
      transmit at least second partial GPS coordinates to the mobile device via a second transmission medium, wherein the first partial GPS coordinates and the at least second partial GPS coordinates are sufficient, when combined, to fully identify the geographic location.

9. The system of claim 8, wherein:
   the first transmission medium includes a sideband of commercial radio station.

10. The system of claim 8, wherein:
    the second transmission medium includes a wide area network.

11. The system of claim 10, wherein the processor is further configured to:
    establish an Internet connection between the mobile device to a website; and
    transmit the at least second partial GPS coordinates directly to the mobile device via the Internet connection, without requiring manual entry of coordinates.

12. The system of claim 11, wherein:
    establishing the Internet connection includes using a code received by the mobile device during a radio broadcast.

13. The system of claim 8, wherein transmitting at least second partial GPS coordinates to the mobile device includes:

transmitting, to the mobile device, a location-based set of live updates to a travel route currently displayed on the mobile device.

14. The system of claim 8, wherein:
the mobile device is configured to receive an Radio Data System (RDS) broadcast signal; and
the at least second partial GPS coordinates are received in the RDS broadcast signal.

15. A non-transitory computer readable medium tangibly embodying a program of instructions to be stored in a memory and executed by a processor, the program of instructions including:
   at least one instruction to encode information associated with a geographic location in a sideband channel of a first transmission medium, wherein:
      encoding the information includes encoding the information in a format readable by a mobile device including a GPS receiver;
      the information including first partial global positioning system (GPS) coordinates, the first partial GPS coordinates insufficient by themselves to completely identify the geographic location;
   at least one instruction to transmit the first partial GPS coordinates to the mobile device, via the sideband channel of the first transmission medium; and
   at least one instruction to transmit at least second partial GPS coordinates to the mobile device via a second transmission medium, wherein the first partial GPS coordinates and the at least second partial GPS coordinates are sufficient, when combined, to fully identify the geographic location.

16. The non-transitory computer readable medium of claim 15, wherein:
the first transmission medium includes a sideband of commercial radio station.

17. The non-transitory computer readable medium of claim 15, wherein:
the second transmission medium includes a wide area network.

18. The non-transitory computer readable medium of claim 17, wherein the program of instructions further comprises:
   at least one instruction to establish an Internet connection between the mobile device to a website; and
   at least one instruction to transmit the at least second partial GPS coordinates directly to the mobile device via the Internet connection, without requiring manual entry of coordinates.

19. The non-transitory computer readable medium of claim 18, wherein:
establishing the Internet connection includes using a code received by the mobile device during a radio broadcast.

20. The non-transitory computer readable medium of claim 15, wherein transmitting at least second partial GPS coordinates to the mobile device includes:
transmitting, to the mobile device, a location-based set of live updates to a travel route currently displayed on the mobile device.

\* \* \* \* \*